US012533043B2

(12) United States Patent
Gärber (10) Patent No.: US 12,533,043 B2
(45) Date of Patent: Jan. 27, 2026

(54) DEVICE FOR PROCESSING AND VISUALIZING DATA OF AN ELECTRIC IMPEDANCE TOMOGRAPHY APPARATUS FOR DETERMINING AND VISUALIZING REGIONAL VENTILATION DELAYS IN THE LUNGS

(71) Applicant: Drägerwerk AG & Co. KGaA, Lübeck (DE)

(72) Inventor: Yvo Gärber, Breitenfelde (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 0 days.

(21) Appl. No.: 18/679,796

(22) Filed: May 31, 2024

(65) Prior Publication Data

US 2024/0315588 A1    Sep. 26, 2024

Related U.S. Application Data

(63) Continuation of application No. 17/064,033, filed on Oct. 6, 2020, now abandoned, which is a continuation (Continued)

(30) Foreign Application Priority Data

Jun. 4, 2015   (DE) .................. 10 2015 006902.0

(51) Int. Cl.
*A61B 5/0536*    (2021.01)
*A61B 5/00*    (2006.01)
(Continued)

(52) U.S. Cl.
CPC ............ *A61B 5/0536* (2013.01); *A61B 5/085* (2013.01); *A61B 5/086* (2025.01); *A61B 5/7246* (2013.01);
(Continued)

(58) Field of Classification Search
CPC .......... A61B 5/08; A61B 5/085; A61B 5/086; A61B 5/7246; A61B 5/7271; A61B 5/742; A61B 5/7425; A61B 5/004; A61B 5/0536

See application file for complete search history.

(56) References Cited

U.S. PATENT DOCUMENTS 5,671,019 A * 9/1997 Isoe .................. H04N 5/45
                                                    348/565
6,049,465 A * 4/2000 Blish, II ............ H01L 24/73
                                                    257/E23.079
(Continued)

OTHER PUBLICATIONS

Thomas Muders, Tidal recruitment assessed by electrical impedance tomography and computed tomography in a porcine model of lung injury, 2012, Crit Care Med, vol. 40, No. 3, pp. 903-910. (Year: 2012).*

(Continued)

*Primary Examiner* — Charles A Marmor, II
*Assistant Examiner* — Andrew E Hoffpauir
(74) *Attorney, Agent, or Firm* — McGlew and Tuttle, P.C.

(57) ABSTRACT

A device (10) processes and visualizes EIT data (3) of at least one region of the lungs to determine and visualize ventilation delays in the lungs of a living being. The EIT data (3) are obtained from an electrical impedance tomography apparatus (30). The device makes it possible to visualize regional ventilation delays of the lungs or of regions of the lungs in which the delay exceeds a predefined duration (76) in a joint image (900).

20 Claims, 1 Drawing Sheet

Related U.S. Application Data of application No. 15/171,439, filed on Jun. 2, 2016, now abandoned.

(51) Int. Cl.
*A61B 5/08* (2006.01)
*A61B 5/085* (2006.01)

(52) U.S. Cl.
CPC ............ *A61B 5/7271* (2013.01); *A61B 5/742* (2013.01); *A61B 5/7425* (2013.01); *A61B 5/004* (2013.01); *A61B 5/08* (2013.01)

(56) References Cited

U.S. PATENT DOCUMENTS

| | | | | |
|---|---|---|---|---|
| 6,501,984 | B1* | 12/2002 | Church | A61B 5/0536 600/547 |
| 6,856,824 | B1* | 2/2005 | Wang | A61B 5/0536 600/425 |
| 7,162,061 | B1* | 1/2007 | Takeo | G06T 7/0012 382/128 |
| 8,103,075 | B2* | 1/2012 | Boese | A61B 6/486 382/130 |
| 2002/0014111 | A1* | 2/2002 | Shin | G01N 11/04 73/54.13 |
| 2003/0076539 | A1* | 4/2003 | Nakajima | H04N 1/3875 382/176 |
| 2006/0221246 | A1* | 10/2006 | Yoo | H04N 21/4334 348/E17.005 |
| 2008/0255537 | A1* | 10/2008 | Voegele | A61K 41/0052 424/490 |
| 2010/0077268 | A1* | 3/2010 | Lee | G11C 29/028 714/718 |
| 2014/0005512 | A1* | 1/2014 | Manwaring | A61B 5/05 600/373 |
| 2015/0287186 | A1* | 10/2015 | Holzhacker | A61B 5/08 382/131 |

OTHER PUBLICATIONS

Zhangi Zhao, The influence of image reconstruction algorithms on linear thorax EIT image analysis of ventilation, May 20, 2014, Physiological Medicine, 45, pp. 1083-1093. (Year: 2014).*

Frerichs, "Electrical impedance tomography (EIT) in applications related to lung and ventilation: a review of experimental and clinical activities," Physiological Measurement, vol. 21, No. 2, pp. R1-R21, May 2000, doi: https://doi.org/10.1088/0967-3334/21/2/201. (Year: 2000).*

*CardioNet LLC* v. *InfoBionic, Inc* (Fed. Cir. 2020) (Year: 2020).*
*Core Wireless Licensing S.A.R.L.* v. *LG Electronics, Inc* (Fed. Cir. 2018) (Year: 2018).*

* cited by examiner

DEVICE FOR PROCESSING AND VISUALIZING DATA OF AN ELECTRIC IMPEDANCE TOMOGRAPHY APPARATUS FOR DETERMINING AND VISUALIZING REGIONAL VENTILATION DELAYS IN THE LUNGS

CROSS REFERENCE TO RELATED APPLICATIONS

This application claims the benefit of priority under 35 U.S.C. § 120 of U.S. patent application Ser. No. 17/064,033, filed Oct. 6, 2020, which claims the benefit of priority under 35 U.S.C. § 120 of U.S. patent application Ser. No. 15/171,439, filed Jun. 2, 2016, which claims the benefit of priority under 35 U.S.C. § 119 of German Patent Application 10 2015 006 902.0 filed Jun. 4, 2015, the entire contents of which are incorporated herein by reference.

FIELD OF THE INVENTION

The present invention pertains to a device for processing and visualizing data of an electrical impedance tomography apparatus for determining and visualizing regional ventilation delays in the lungs of a living being. The device according to the present invention makes possible a special form of imaging of lung regions in which ventilation is delayed relative to a comparison variable.

BACKGROUND OF THE INVENTION

Devices for electrical impedance tomography have been known from the state of the art and are designed and intended for generating an image, a plurality of images or a continuous sequence of images from signals obtained by means of electrical impedance measurements and from data and data streams obtained therefrom. These images or image sequences show differences in the conductivity of different body tissues, such as bones, skin, body fluids and organs, especially the lungs, which are useful for an observation of the patient's situation.

Thus, U.S. Pat. No. 6,236,886 describes an electrical impedance tomograph with an array of a plurality of electrodes, a power supply unit at least two electrodes, a signal detection unit at the other electrodes and a method with an algorithm for image reconstruction for determining the distribution of conductivities of a body, such as bones, skin and blood vessels, in a general embodiment with components for signal detection (electrodes), signal processing (amplifier, A/D converter), current feed (generator, voltage-current converter, current limiter) and components for control.

It is stated in U.S. Pat. No. 5,807,251 that it is known in the clinical application of EIT that a set of electrodes, which are arranged at a defined distance from one another, for example, around the chest of a patient in electrical contact with the skin, is provided as an electrode ring. An electric current or voltage input signal is applied alternately between different pairs or all the possible pairs of electrodes arranged adjacent to one another. While the input signal is applied to one of the pairs of electrodes arranged adjacent to one another, the currents or voltages between each pair of the other electrodes, which pairs are located adjacent to each other, are measured, and the measured data obtained are processed in the known manner in order to obtain an imaging of the distribution of the specific electrical resistances over a cross section of the patient, around which patient the electrode ring is arranged, and to display it on a screen.

Unlike other imaging radiological methods (X-ray apparatuses, radiological computed tomographs), electrical impedance tomography (EIT) offers the advantage that no radiation load that is hazardous to the patient occurs. Contrary to sonographic methods, a continuous image recording can be performed with EIT over a representative cross section of the entire thorax and of the lungs of the patient by means of the electrode belt.

It is possible, in particular, by means of EIT to make possible an imaging of the lungs in the transverse plane of the body in a so-called "tidal image" to show which areas of the lungs are well ventilated and which areas of the lungs are ventilated less well, because the impedances of well ventilated and less well ventilated lung tissues differ markedly from one another.

It is described in the scientific article "Local mechanics of the lung tissue determined by functional EIT" [Physiol. Meas., 17, 1996] that, in addition to the impedances or impedance differences in the EIT, local phase information on individual areas of the lungs can be determined and imaged in the form of a so-called EIT phase image (phase plot) together with the EIT impedance curve (contour plot) in a joint view (combined functional EIT phase image). Differences in the phase positions of different lung regions from one another can thus be shown.

A basic requirement for analyzing a regional distribution of the ventilated air at the end of the inhalation (end-inspiratory state) and to investigate the behavior over time during the inhalation and exhalation is a measuring rate and scanning rate of the EIT, which make it possible to reconstruct an image sequence in order to resolve in time individual breaths, especially the inhalation phase and the exhalation phase of the breaths. It is thus possible not only to analyze the regional distribution of the ventilated air in the end-inspiratory state, but also to investigate the behavior over time during the inhalation and during the exhalation in order to infer lung-mechanical processes in the different areas of the lungs therefrom. Lung-mechanical processes are, for example, inflow or outflow characteristics of the air caused by flow resistances in the airways and bronchioles or redistribution between different lung regions during the inhalation or exhalation. Further lung-mechanical effects arise, for example, in case of an excessively high ventilation pressure but also in case of an excessively low ventilation pressure so that alveoli are collapsed in some lung regions due to an overexpansion (overdistension, pulmonary emphysema), on the one hand. and, on the other hand, alveoli are collapsed due to an insufficient opening pressure, so that these alveoli are not available for the gas exchange with the blood circulation.

It is described in this connection in EP 2 228 009 A1 that the global phase of inhalation or phase of exhalation can be divided into a plurality of equidistant volume steps and plotted as intratidal variations (ITV), i.e., redistributions of the ventilated partial volumes within the lungs per volume step of the amounts of air having flowed in during inhalation and having flown out during exhalation in the form of curves. Curves of the intratidal variations (ITV) are thus obtained for different regions, so-called "regions of interest" (ROI). Since these curves are always examined over the ROIs, what is obtained is not a visually readily accessible image but a plurality of curves. These curves cannot be imaged in the tidal image of the ventilation, so that an additional output, for example, on an additional screen or additional display window next to the tidal image view is necessary for imaging and using the ITV.

An electrical impedance tomography apparatus is described in EP 2 762 061 A1, with which intratidal redistributions (ITV) of amounts of air within the lungs are detected locally within the lungs and a redistribution parameter (ITU) of the local intratidal redistributions is determined from this. Unlike the curves described in EP 2 228 009 A1, this redistribution parameter (ITU) can be displayed graphically with image elements. These local intratidal redistributions are determined by the phase of inhalation and the phase of exhalation being divided in the course of ventilation into a number of steps of equal volume change and by corresponding times being determined for these steps of equal volume change in the phase of inhalation or in the phase of exhalation. The ratio of the local impedance change to the ventilation curve is always determined in order to form a function of the steps of equal volume change and to determine a scalar parameter characteristic of the course over the phase of inhalation or the phase of exhalation. The steps of equal volume change predefine relatively rigid boundary conditions, which make it more or less possible to obtain information representative of the assessment of ventilation depending on the selected mode of ventilation, ventilation rate, duration of inhalation and duration of exhalation.

Another example of regional lung-mechanical processes is described in the scientific article "Tidal recruitment assessed by electrical impedance tomography and computed tomography in a porcine model of lung injury" [Critical Care Med., 2011, Vol. 40, No., 3]. It is mentioned there that local inhalation curves can be determined in case of a predefined ventilation pattern determined by the ventilator, a so-called "low-flow maneuver." Low-flow maneuvers are maneuvers in which the inflow of air into the lungs is deliberately performed with very low flow rates (flow). This leads to a comparatively long duration for the inhalation, and the beginning and the end of the inhalation are clearly provided and determined by the initiation of the maneuver and do not have to be determined from measured values. These local inhalation curves are determined by relating the time at which 40% of their maximum impedance value is reached to an impedance curve during the inhalation time and by generating from this an image of regions with below average or above average time constants. A so-called "Regional Ventilation Delay Index" (RVD) is defined from this.

The drawback of this procedure is the use of the fixed threshold value of 40% of the maximum in relation to the impedance curve during the inhalation time, because the delay times determined in this manner are comparable only if the above-mentioned low-flow maneuver is employed. This means that the low-flow maneuver must be performed from time to time (daily, weekly) in order to be able to follow up a trend of the RVD index. Continuous monitoring of the course of the RVD index with different settings of the ventilation pressure and of the ventilation pressure curve is not possible in this manner. The use of other forms of ventilation would have a direct effect on the particular time in the course of the ventilation at which 40% of the maximum is reached.

Together with the settings of the ventilation parameters to be adapted to the patient such as tidal volume (Vt), respiration rate (RR), inhalation to exhalation ratio (I:E ratio), inspiratory and expiratory pause, inspiratory pressure (Pinsp), positive end-expiratory pressure (PEEP), different forms of ventilation, such as pressure-controlled ventilation or volume-controlled ventilation have a difference in terms of the phase of inhalation during which a majority of the tidal volume set flows into the lungs. Thus, there may be, for example, a constellation, due to the setting of the ventilation mode and ventilation parameters, in which 40% of the maximum of the ventilation is reached in the first third of the inhalation time, and it may happen in another possible constellation that 40% of the maximum of the ventilation is reached only in the last third of the inhalation time.

RVD values are thus obtained for different lung regions that are affected essentially by the mode of ventilation and the ventilation parameters rather than by the lung-mechanical properties of the lung regions of the living being only, especially in case of the graphic imaging of faster or slower regions with below average or above average time constants.

Time differences in the inflow of air into the lungs during the inhalation as well as in the outflow of air from the lungs during the exhalation in different lung regions can be visualized in the EIT as phase shifts of the respective total durations of inhalation and exhalation in relation to one another, for example, in the form of an imaging of an overall view of all phase shifts, as described in the above-mentioned scientific article "Local mechanics of the lung tissue determined by functional EIT" [Physiol. Meas., 17, 1996]. In addition to the phase differences described in this article as a possible cause of delayed ventilation of lung regions, there also are, as described in the above-mentioned scientific article "Tidal recruitment assessed by electrical impedance tomography and computed tomography in a porcine model of lung injury" [Critical Care Med. 2011, Vol. 40, No. 3], delays in the gas exchange of lung regions, which are induced by the method of the ventilation and are due to the so-called "tidal recruitment." "Tidal recruitment" describes a state of lung regions in which individual collapsed alveoli or a plurality of collapsed alveoli open with a delay only when the pressure increases during the inhalation and close again, i.e., collapse prematurely compared to the other regions of the lungs during the exhalation with the ventilation pressure decreasing.

The settings of the ventilation pressure and of the ventilation pressure curve have an effect on how and which regions of the lungs are affected by "tidal recruitment." Consequently, these individual collapsed alveoli or this plurality of collapsed alveoli are consequently characterized, compared to the other regions of the lungs, by both a shorter inhalation time and a shortened exhalation time.

The consequence of this is that in a manner similar to what is described in the above-mentioned scientific article "Local mechanics of the lung tissue determined by functional EIT" [Physiol. Meas. 17, 1996], hardly any phase shift could be recognizable in a phase image. Thus, no lung regions with delayed ventilation can be recognized in the state of a "tidal recruitment" from such a phase image alone. By contrast, the "regional ventilation delay index" (RVD) includes such lung regions with delayed ventilation in the state of a "tidal recruitment," with the drawbacks already mentioned before in connection with the discussion of the scientific article "Tidal recruitment assessed by electrical impedance tomography and computed tomography in a porcine model of lung injury" [Critical Care Med. 2011, Vol. 40, No. 3], namely, that the so-called "low-flow maneuver" must be applied to determine the RVD index, or, as was already mentioned above, the method of ventilation (tidal volume, respiration rate, I:E ratio, Pinsp, PEEP) affects the RVD index.

SUMMARY OF THE INVENTION

With the knowledge of the above-described drawbacks of the known state of the art, an object of the present invention is to provide a device that makes it possible to determine regional ventilation delays of the lungs from EIT data and to process them into a joint image with a tidal image of the lungs.

Another object of the present invention is to determine the regional ventilation delays of the lungs from EIT data without the method of ventilation substantially affecting the determination of the regional ventilation delays.

Some of the terms used in connection with this patent application are explained in more detail as follows.

A time period in a time curve is defined as an observation period in the sense of the present invention. The beginning and the end of such an observation period are given either by fixed or adaptable times or by events, which are given by the properties of breathing or ventilation. Examples of observation periods, which are based on breathing or ventilation, are a breathing cycle, a plurality of breathing cycles, parts of breathing cycles, such as inhalation, inspiratory pause, exhalation, and expiratory pause. Further observation periods, especially in case of artificial respiration, may be periods with defined pressure levels, such as plateau pressure PIP pressure (positive inspiratory pressure, PIP), or PEEP pressure (positive end-expiratory pressure, PEEP), PIP or PEEP pressure levels, rising or falling PIP pressure ramps or PEEP pressure ramp as a part of a special ventilation maneuver or time periods that correspond to defined properties of ventilation modes (e.g., bi-level positive airway pressure, BiPAP).

Measured EIT signals are defined in the sense of the present invention as the following signals or data, which can be detected with an EIT apparatus by means of a group of electrodes or by means of an electrode belt. These include Measured EIT signals with different signal characteristics, such as electric voltages or measured voltage signals, electric currents or measured current signals, assigned to electrodes or groups of electrodes or to positions of electrodes or of groups of electrodes on the electrode belt, as well as electric resistance or impedance values derived from voltages and currents.

A measuring cycle is defined in the sense of the present invention as a sequence of feeds at a plurality of feeding electrode pairs with a corresponding measuring run each on other electrodes. Such a measuring cycle is typically called a so-called "frame" or "time frame" in connection with the processing of EIT data. A measuring cycle is composed of a plurality of measuring runs. A measuring run is defined in the sense of the present invention as a signal feed at two feeding electrodes, a so-called feeding electrode pair, during which detections of measured EIT signals are performed on other electrodes that are different from these two feeding electrodes, A measuring run as part of the measuring cycle is correspondingly called typically a "partial frame" in connection with the processing of EIT data.

A control signal is defined in the sense of the present invention as an individual control signal, a control signal as part of a set of control signals, as well as a plurality or a set of control signals. An output signal is defined in the sense of the present invention as an individual output signal, an output signal as part of a set of output signals, as well as a plurality or a set of output signals.

A tidal image of the lungs is defined in the sense of the present invention as an image that corresponds to a imaging, in a locally resolved manner, of a distribution of local impedances in a transverse view of the lungs at a defined time. The impedances are determined continuously during the measuring cycle. The local impedances represent the degree of filling of local lung regions with air at the rhythm of inhalation and exhalation. A plurality of tidal images of the lungs in a chronological sequence, for example, as a sequence of images or film, represent the changes in the impedances and hence changes over time in the ventilation of individual local lung regions.

The device according to the present invention comprises
a data input unit,
a calculation and control unit and
a data output unit
for processing and visualizing EIT data obtained for at least one region of the lungs or thorax by means of an electrical impedance tomography apparatus suitable for generating data for imaging.

The data input unit is configured to receive and provide EIT data of at least one region of the lungs or of the thorax. The EIT data represent, for a plurality of lung regions, regional ventilation situations of the lungs for at least one location of the lungs over an EIT detection period. A typical EIT detection period comprises one or more measuring cycles (time frames) with EIT data. The data input unit preferably has interface elements for this, for example, level converters, amplifiers, A/D converters, components for overvoltage protection, logic elements and additional electronic components for the wired or wireless reception of data and signals, as well as adaptation elements, such as code or protocol conversion elements for adapting the signals and data for the further processing in the calculation and control unit.

The calculation and control unit is configured
to determine local impedances and local impedance changes of at least one region of the lungs from the EIT data,
to determine a tidal image of a local distribution of the impedance values and impedance changes in the lungs from the local impedances and local impedance changes and to generate and provide a first control signal, which is representative of the determined tidal image,
to determine regional ventilation delays in the lungs in relation to a comparison variable related to the observation period from the local impedances and local impedance changes using a volume/impedance criterion in an observation period,
to analyze the regional ventilation delays in the lungs to determine whether the determined regional ventilation delays exceed a predefined duration, and
to generate and provide a second control signal that represents the local regions of the lungs, the regional ventilation delays of which exceed the predefined duration.

The determination of the regional ventilation delays in the lungs is performed by means of the calculation and control unit in such a way that the volume/impedance criterion is used. The volume/impedance criterion is a criterion that is characteristic or representative of the inflow or outflow of amounts of air into the lungs and out of the lungs during the observation period.

The determination of the regional ventilation delays in the lungs is performed according to the present invention in relation to the comparison variable, which is related to the observation period. A global impedance curve or a variable derived from the global impedance curve is preferably used here as the comparison variable with reference to the observation period. A phase of inhalation or a phase of exhalation may preferably be used as the observation period and reference is made to a phase of inhalation or a phase of exhalation as the observation period.

Further, a plurality of phases of inhalation may be selected as the observation period. Further, a plurality of phases of exhalation may be selected as the observation period.

To determine the phases of inhalation and the phases of exhalation, as well as to separate the phase of inhalation and the phase of exhalation from one another in the time curve of ventilation, the global impedance curve is determined by the calculation and control unit over several measuring cycles, preferably by means of methods of forming weighted or unweighted averages of a plurality of local impedances, from the EIT data or the local impedances or local impedance changes determined therefrom. The separation of phases of inhalation and phases of exhalation is then performed by the calculation and control unit from the shape of the global impedance curve. An additional weighting of the determined local impedances or of the local impedance changes offers, for example, the advantage that the calculation and control unit is thus able, for example, to include impedances of core regions of the lungs and impedances of marginal regions of the lungs, as they are obtained in the usual transverse view generated by the electrical impedance tomography, differently in the contribution to the global impedance curve. If a greater weighting factor is placed on the core regions or central regions of the lungs, it is thus possible to also take into account the physical conditions of the distribution of the amounts of air in the lungs. This leads to advantages in separating phases of inhalation and phases of exhalation.

The impedance curves of the plurality of phases of inhalation or of the plurality of phases of exhalation can be preprocessed or processed, in another favorable manner, by means of averaging and weighted or unweighted averaging methods to determine the regional ventilation delay in the lungs.

The volume/impedance criterion in the observation period is determined from the curve describing the impedance changes during the observation period over a plurality of measuring cycles during the observation period preferably such that a defined amount of the inspiratory volume must have flown into the lungs as an inspiratory flow rate ($Flow_{insp}$) during the inhalation or a defined amount of the expiratory volume must have flown out of the lungs as an expiratory flow rate ($Flow_{exsp}$) during the exhalation.

The volume/impedance criterion is applied according to the present invention with reference to the observation period. The volume/impedance criterion in the observation period can be formed and applied for the inhalation preferably and as an example as a selected observation period by forming a ratio of a defined duration of a local region impedance curve tx to a defined duration of the global impedance curve Tx during the observation period of the phase of inhalation. The volume/impedance criterion in the calculation and control unit can preferably be formed and used for the exhalation as a selected observation period by forming a ratio of a defined duration of a local region impedance curve tx to a defined duration of the global impedance curve Tx during the observation period of the phase of exhalation.

The following Formulas 1 and 2 define an RVD (regional ventilation delay) index as an example as a percentage value and represent the relationship therefor for the situation of inhalation $T_{insp}$ and for an exhalation $T_{exsp}$ as observation periods.

$$RVD_{insp} = \frac{t_x - T_x}{T_{insp}} * 100 \quad \text{Formula 1}$$

$$RVD_{exp} = \frac{t_x - T_x}{T_{exp}} * 100 \quad \text{Formula 2}$$

A reference value of 40%, which is usual for the RVD index, and which proved to be a good value in studies, is stated here as an example. The volume/impedance criterion is defined in this example such that a duration T40, during which an impedance value corresponding to 40% of the maximum impedance value $T_{max}$ of the global impedance curve, is used as the reference point in time for the assessment of the local impedance curve, counting from the beginning of the phase of inhalation.

The local impedance curve is assessed now according to the time reference $t_{40}$ of a local impedance value with 40% of the maximum impedance value $t_{max}$ of the local impedance curve to the duration $T_{40}$ of the global impedance curve. The time reference is then obtained as a time difference. The examination of the local impedance curves in reference to the global impedance curve is synonymous in the phase of inhalation with an examination of a degree of filling during the volume inflow of air into a defined local region of the lungs to a mean global degree of filling of the lung volume with air since the beginning of the phase of inhalation. In a similar and comparable manner, the volume/impedance criterion can likewise preferably be formed, as an example, for the exhalation by forming a ratio of a defined duration of a local region $t_x$ to a defined duration of the global impedance curve $T_x$ during a phase of expiration. An adaptation of the percentage value of 40% of the maximum impedance value $T_{max}$ of the global impedance curve or of the percentage value of 40% of the maximum impedance value $t_{max}$ of the local impedance curve to other percentage values suitable for exhalation, e.g., 60% in each case, may possibly be necessary for taking into account the outflow conditions of the lungs during the phase of exhalation.

Formulas 3 and 4 below represent embodiments of Formulas 1 and 2 with the above-described percentage values of 40% and 60%.

$$RVD_{insp} = \frac{t_{40} - T_{40}}{T_{insp}} * 100 \quad \text{Formula 3}$$

$$RVD_{exp} = \frac{t_{60} - T_{60}}{T_{exp}} * 100 \quad \text{Formula 4}$$

The examination of the local impedance curves in reference to the global impedance curve is synonymous in the phase of expiration with an examination of a degree of emptying during the volume outflow of air from a defined local region of the lungs to a mean global degree of emptying of air from the lung volume since the beginning of the phase of exhalation.

The reference to the observation period and the reference to the comparison variable in the observation period offer the advantage that the effect of the ventilation mode with which the patient is ventilated during the EIT measurement, as well as the effect of the particular ventilation parameters to be adapted to the patient according to age, gender and clinical picture, such as tidal volume (Vt), respiration rate (RR), inhalation to exhalation ratio (I:E), inspiratory pause and expiratory pause, inspiratory pressure (Pinsp), positive end-expiratory pressure (positive end-expiratory pressure: PEEP), is reduced. This will then lead to the advantage that a user, who is interested in a determination and imaging of regional ventilation delays obtained by means of the electrical impedance tomography, is not restricted in terms of varying the ventilation parameters and in selecting the ventilation mode. Thus, for example, he is not forced, in particular, to perform defined maneuvers, for example, low-flow maneuvers with the ventilator in order to obtain the regional ventilation delays of the lungs. By forming a time reference as a time difference to the global impedance curve, it is obtained that there are local regions in the lungs into which the air flows (inhalation) and out of which the air flows (exhalation) later, i.e., with a delay, compared to the average of the observation period, namely, the global impedance curve. Due to the reference to the global impedance curve, there also are, however, local regions in the lungs into which the air flows (inhalation) and out of which the air flows (exhalation) sooner, i.e., leading compared to the average over the observation period, namely, the global impedance curve. The local regions of the lungs, into which the air flows with a delay or with a marked delay, are essentially of interest for an assessment of the situation of the lungs, especially for the assessment of the ventilation situation of individual local regions of the lungs.

The essential advantage of the present invention is therefore that the regional ventilation delays determined in the lungs during the observation period are analyzed to determine whether the determined ventilation delays exceed the predefined duration. If the determined regional ventilation delays exceed the predefined duration, the second control signal, which represents the local regions of the lungs, whose regional ventilation delays exceed the predefined duration, is determined for those regional ventilation delays. This second control signal is used in the calculation and control unit together with the first control signal, which is representative of the tidal image of the lungs, to generate, provide or output an output signal.

The output signal is representative of a superimposition of a tidal image of one or more regions of the lungs with an image of the respective regional ventilation delays of one or more regions of the lungs, whose regional ventilation delays exceed the predefined duration. From this arises the fact that, when this output signal is used for an output in a joint image, the regional ventilation delays are fading, in a superimposing manner, into the tidal image in the joint image in those local regions only that exceed the predefined duration. This advantageously increases the possibility of analyzing the joint image, because the local regions of the lungs of special interest, namely, the local regions of the lungs, into which the air flows with a delay or with a marked delay, can be made distinctly visible in the joint image. In addition to elements that represent the regional ventilation delay, the output signal may also have, in the sense of the present invention, information elements that make it possible to highlight local regions with shading, with colors, graphic codes an the basis of grey tints, brightness levels, color transparency or saturation levels or patterns and thus it can be displayed by the data output unit as an image, graphically and/or visually. This enables the downstream output unit to show the essentially delay-free regions of the lungs with a color scale of blue, with light blue ranging to white as a graphic graduation for a degree of ventilation and they show the regional delays with a color scale of red, with dark red, brown to black as a graphic graduation for a degree of delay.

To carry out the described tasks of the calculation and control unit, the calculation and control unit has elements for data processing, calculation and process control, such as microcontrollers (µC), microprocessors (µP), signal processors (DSP), logic components (FPGA, PLD), memory chips (ROM, RAM, SD-RAM), and combination variants thereof, for example, in the form of an "embedded system," which are configured together with one another and are adapted to one another or are configured by programming to carry out the necessary steps for processing and visualizing data obtained by means of an EIT apparatus suitable for generating data for imaging into a determination of regional ventilation delays of the lungs and to process them as an output signal for a joint image with the tidal image of the lungs. The image processing and output unit is configured to output, provide or show regional ventilation delays of a lung or of the lungs using the output signal. The image processing and output unit is configured to generate, provide or show the output signal. The output signal is preferably configured as a video signal (e.g., Video Out, Component Video, S-Video, HDMI, VGA, DVI, RGB) to make possible a graphic, numerical or pictorial imaging of the regional ventilation delays of the lungs on a display unit connected to the output unit in a wireless or wired manner (WLAN, Bluetooth, WiFi).

In a preferred embodiment, a data output unit with a component for graphic visualization is arranged or connected in or at the device for processing and visualizing EIT data. The components for a graphic visualization is configured for visualizing a joint image with the use of the output signal. The image corresponding to the output signal, which image represents the respective regional ventilation delays of one or more regions of the lungs, whose regional ventilation delay exceeds the predefined duration, is superimposed to the tidal image ion the joint image.

In another preferred embodiment, the volume/impedance criterion is derived from the shape of the global impedance curve in the observation period in combination with a tidal volume. A tidal volume (Vt) applied to the patient is combined here with the global impedance curve during the observation period into the volume/impedance criterion. This other preferred embodiment has the advantage that the local impedances can be examined not only relative to one another in the observation period or relatively between the beginning and the end of the inhalation or between the beginning and the end of the exhalation to the global impedance curve. The combination with the tidal volume leads to the advantage of standardizing the global impedance curve to the volume of air actually present in the lungs in the course of the inhalation and exhalation. Via the global impedance curve, this standardization also affects the volume/impedance criterion, as this can be understood by means of Formulas 1 and 2, because a relationship of a defined duration $t_x$ until a defined local impedance value of a local region is reached to a defined duration $T_x$ of the global impedance curve until a defined global impedance value is reached during a defined observation period (phase of inhalation, phase of exhalation) is used there to determine the RVD index.

A duration of a phase of inhalation or of a plurality of phases of inhalation is selected as the observation period in another preferred embodiment, and the volume/impedance criterion is derived from the shapes of local impedance curves of one or more phases of inhalation combined with the tidal volume.

A duration of a phase of exhalation or of a plurality of phases of exhalation is selected as the observation period in another preferred embodiment, and the volume/impedance criterion is derived from the shapes of global impedance curves of one or more phases of exhalation, always combined with the tidal volume.

In another preferred embodiment, the duration of inhalation is determined from the shape of a global impedance curve.

In another preferred embodiment, the duration of exhalation is determined from the shape of a global impedance curve.

In another preferred embodiment, the duration of inhalation is determined on the basis of a selected set of impedance values. The selected set of impedance values preferably represents, for example, at least one selected region of the lungs, which is representative of the ventilation of the lungs and/or of a gas exchange of the lungs as a whole.

In another preferred embodiment, the duration of exhalation is determined on the basis of a selected set of impedance values. The selected set of impedance values preferably represents, for example, at least one selected region of the lungs, which is representative of the ventilation of the lungs and/or of a gas exchange of the lungs as a whole.

In another preferred embodiment, the calculation and control unit is configured to perform a numerical stabilization of the EIT data of the local impedances or of impedance changes and to generate and provide a numerically stabilized second control signal. This second numerically stabilized control signal is used with the first control signal to generate, provide or output the output signal. The numerical stabilization is performed, for example, by means of signal filtering, preferably and, for example, by means of a low-pass filtering. The signal filtering is performed by means of the calculation and control unit, for example, in the form of a digital filtering (FIR filtering, Gauss filter, IIR filter) or a median filtering of the EIT data, of the local impedances or impedance changes.

Further examples for additional methods for the numerical stabilization of the EIT data, of the local impedances or impedance changes are an oversampling of the EIT data, interpolations (carried out, for example, as linear, quadratic or spline interpolation) between scanned values following each other in time, removal of individual data outside the population of the EIT data ("freak value" removal).

The numerical stabilization causes, on the one hand, interferences, which are superimposed to the EIT data, to affect the second control signal as little as possible and consequently also to affect the output signal and hence ultimately the superimposition of the tidal image to the image that represents regional ventilation delays as little as possible. On the other hand, the numerical stabilization of the EIT data indirectly also brings about an improvement in the quality of the global impedance curve. Improved quality of the global impedance curve results in improved accuracy of the determination of the phases of inhalation and phases of exhalation, as well as of the separation in time between phases of inhalation and phases of exhalation, as well as in an improvement in the quality of the comparison variable determined from the global impedance curve. In addition, an improvement in the signal-to-noise ratio is achieved by the numerical stabilization, so that it is possible to recognize, in particular, great time delays in the ventilation of individual lung regions with a high degree of reliability. Great time delays are indicative of lung regions with a state of "tidal recruitment" mentioned before. A number of essential advantages arise from the numerical stabilization in terms of the robustness of the determination of regional ventilation delays (RVD).

The present invention will be explained now in more detail with reference to the FIGURE below and the corresponding description of the FIGURE without limitation of the general inventive idea. The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
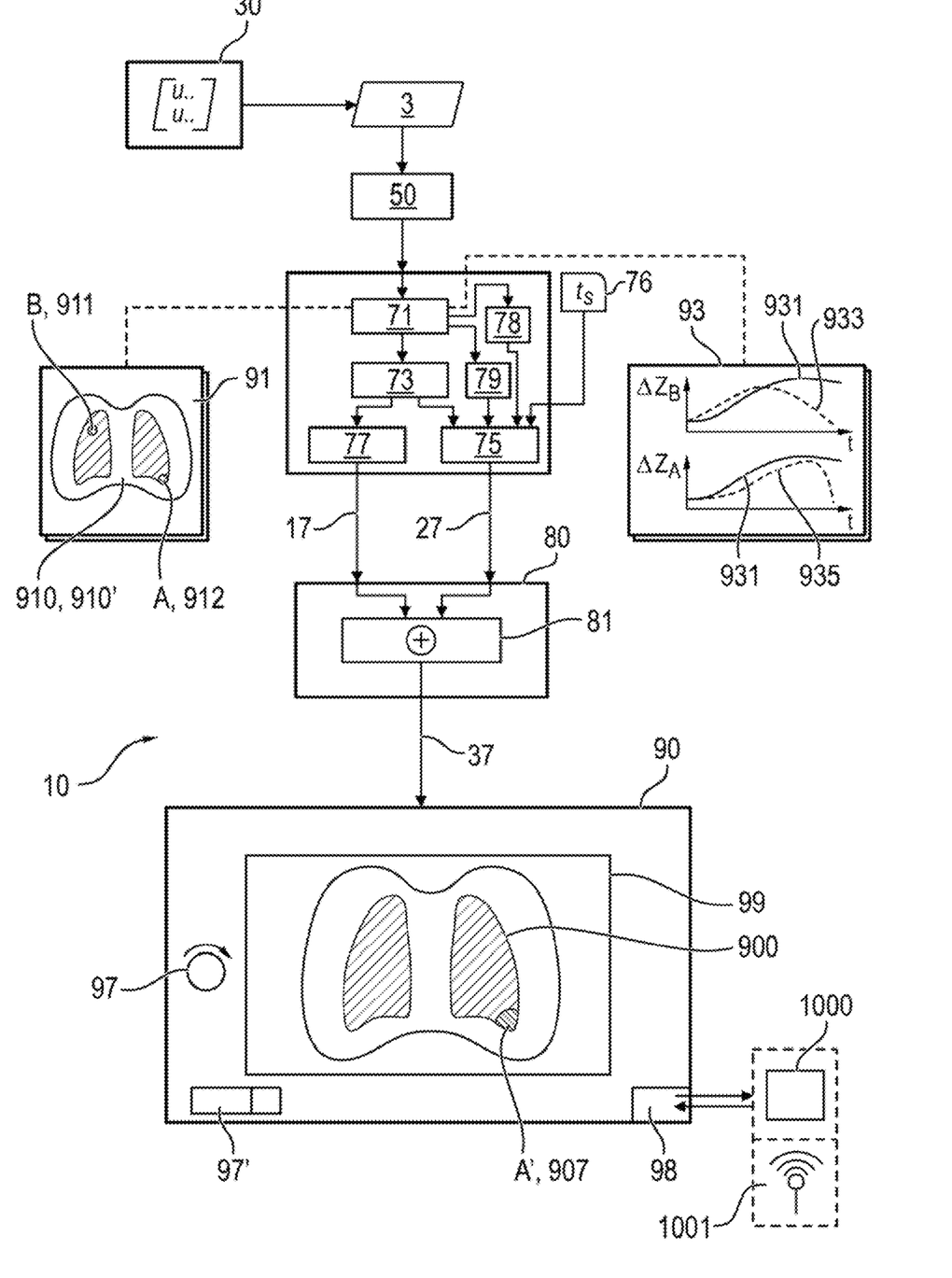
FIG. 1 is a schematic view of a device for processing and visualizing data with graphic imaging of the tidal image with regional ventilation delays.

Referring to the drawings, FIG. 1 shows a device 10 for processing and visualizing data. The device 10 has as its essential components a data input unit 50 a calculation and control unit, an image processing and output unit 80 as well as a data output unit 90. EIT data 3 are transmitted or sent from an EIT apparatus 30 to the calculation and control unit by means of the data output unit 50. The EIT data 3 are processed further in the calculation and control unit. Impedance values are calculated in an impedance calculation unit present in the calculation and control unit after the EIT data 3 are received. Impedance values of different local regions of the lungs are calculated, and these values make it possible to visualize a distribution of the impedances in the lungs of a living being on the basis of the EIT data 3 obtained with the EIT apparatus 30. The impedances represent different degrees of ventilation of lung regions in the lungs. The impedance values and impedance changes obtained with the impedance calculation unit 71 as well as the curves describing impedance changes are transmitted by means of a data splitting unit 73 to a delay calculation unit 75 and to a tidal image calculation unit 77. The tidal image calculation unit 77 uses the impedances, impendence courses or impedance curves calculated by the impedance calculation unit 71 to generate a so-called tidal image of the lungs and to output a first control signal 17, which is representative of a tidal image generation 910. Furthermore, a volume/impedance criterion 78 and a comparison variable in the observation period 79 are determined in the impedance calculation unit 71. The comparison variable in the observation period 79 represents a reference point, with respect to which the ventilation of the lung regions is to be assessed concerning a delay, for the observation period 79, for example, an inhalation or an exhalation. This comparison variable 79 is determined by the impedance calculation unit 71 on the basis of a global impedance curve 931, which represents, summarily as a whole, the different regional impedances, which were determined from the EIT data 3 for different regions of the lungs. Furthermore, a volume/impedance criterion 78 is determined by the impedance calculation unit 71. Another function of the impedance calculation unit 71 or of the calculation and control unit is to determine phases of the inhalation and phases of the exhalation from the determined impedance data and/or the global impedance curve 931 and to distinguish them from one another. A phase of inhalation or a phase of exhalation represents an observation period. The volume/impedance criterion 78 is determined for this observation period on the basis of the global impedance curve 931. The volume/impedance criterion 78 is a criterion that is representative or characteristic of the percentage of the total amount of air flowing into the lungs during a phase of inhalation or flowing out of the lungs during the phase of exhalation as a reference criterion for the classification in time of the flow conditions (inflow, outflow) in individual local regions of the lungs. Furthermore, a predefined duration $T_s$ 76 is sent as a setting parameter to the calculation and control unit or the delay calculation unit 75. The predefined duration $T_s$ 76, the volume/impedance criterion 78, as well as the comparison variable in the observation period 79 are used by the delay calculation unit to generate a second control signal 27. The second control signal 27 is representative of an RVD image generation.

By means of dotted lines, FIG. 1 shows as additional elements a tidal image output 91 to the impedance calculation unit 71 and an RVD image output 93, connected to the impedance calculation unit 71 and to the processing and visualizing unit 10. This tidal image output 91 and the RVD image output 93 are not parts of the processing and visualizing unit 10, and they are used in this FIG. 1 only to illustrate the difference in the imaging of the tidal images concerning the ventilation delays. The tidal image generation 910 in the tidal image output 91, as well as the RVD image generation in the RVD image output 93 are not consequently functionally present units of the data processing and visualization device 10, but are used only to illustrate the difference from a separate output of a tidal image and of an RVD image as opposed to a joint image 900 of a lung contour in the tidal image with superimposed RVD image. As a result of the tidal image generation 910, the tidal image output 91 shows a tidal transverse view 910' of the lungs at the end of an inhalation, in which two regions, namely the left lobe and the right lobe of the lungs, are shown as shaded areas. The shading shall indicate that these regions have similar impedances in the EIT measurement and therefore have a comparable ventilation situation at the end of the inhalation. In addition, two regions A, 912 and B, 911 are also marked in the tidal transverse view 910'. Two impedance curves, which represent shapes showing impedance changes $\Delta Z$ for the regions A, 912 and B, 911, are shown as functions $f(t)=\Delta Z(t)$ of the time in the RVD image output 93 for these two regions A, 912 and B, 911. An imaging of a shape of a regional impedance curve $\Delta Z_B(t)$ 933 is shown in the upper part of the RVD image output 93 together with the shape of the global impedance curve $\Delta Z_{Global}(t)$ 931 over an observation period, which is a duration of a phase of inhalation in this exemplary case shown. An imaging of a shape of a regional impedance curve $\Delta Z_A(t)$ 935 is shown together with the shape of the global impedance curve $\Delta Z_{Global}(t)$ 931 over the duration of the phase of inhalation in the lower part of the RVD image output 93. The global impedance curve $\Delta Z_{Global}(t)$ 931 is used in this imaging as a volume/impedance criterion 78 for the assessment of the regional impedance curves $\Delta Z_A(t)$ 935 and $\Delta Z_B(t)$ 933.

It is illustrated that the curve of the local impedance $\Delta Z_B(t)$ 933 leads the global impedance curve $\Delta Z_{Global}(t)$ 931, whereas the local impedance curve $\Delta Z_A(t)$ 931 lags in time behind the global impedance curve $\Delta Z_{Global}(t)$ 931. The delay calculation unit 75 is both to make a distinction between whether regional ventilation delays lead or lag behind the global impedance curve $\Delta Z_{Global}(t)$ 931 and to assess the lagging regional delays thus determined to determine whether the lagging regional delays exceed the predefined duration $T_s$ 76. Only the regional delays which are lagging relative to the global impedance curve $\Delta Z_{Global}(t)$ 931 and whose lag time exceeds the predefined duration $T_s$ 76 are taken into account by the delay calculation unit 75 for generating the second control signal 27. The first control signal 17 and the second control signal 27 are transmitted from the calculation and control unit to the image processing and output unit 80. An image superimposition unit 81 is provided in the image processing and output unit 80. This image superimposition unit 81 combines the first control signal 17 and the second control signal 27 into an output signal 37. This output signal 37 is then provided. The output signal 37 is made available in this FIG. 1 to, for example, a data output unit 90 connected to the device 10. Different elements are present in this data output unit 90. For example, there is a component for graphic visualization, e.g., a screen 99. Furthermore, operational controls 97, 97', such as buttons 97' or rotary knobs 97, are arranged in the data output unit 90. Furthermore, an interface 98 is optionally provided at the data output unit 90 for a data exchange with additional devices, for example, with an external monitor 1000 or with a hospital data network 1001 (LAN, WAN, WLAN, Ethernet, WiFi), which are not shown more specifically in detail in this FIG. 1. The joint image 900 of the tidal image and RVD image is displayed in the graphic visualization unit 99. The regional ventilation delays 75 that exceed a predefined duration $T_s$ 76 are determined in the delay calculation unit 75. Only the regions whose regional ventilation delays exceed this predefined duration $T_s$ 76 are shown as an RVD image in a superimposed manner in the joint image 900 in the joint tidal image, the RVD image of the joint image 900. In the case shown in FIG. 1, this means that region A, 912 of the transverse view 910 of the tidal image output 91 is shown in the joint image 900 of the lung contour with a lagging regional ventilation delay as an especially marked region A', 907 in the image of the lung contour and is graphically especially highlighted. This has the advantage that the user obtains a prepared view of the regional ventilation delays which are substantially relevant for the assessment of the ventilation situation in the lungs concerning regional ventilation delays. Regional ventilation delays, which do not actually represent delays, because they are leading relative to the volume/impedance criterion 78 or have a lag time that does not exceed the predefined duration $T_s$ 76, are not shown in a highlighted form in the joint image 900 as special regions. Therefore, region B, 911 of the tidal transverse view 910 of the tidal image output 91 is not shown highlighted as a special region in the joint image 900 in this exemplary case in FIG. 1. Instead of a highlighting by shading, as is shown in FIG. 1, an imaging and highlighting with colors, graphic codes on the basis of grey tints, brightness levels, color transparency or saturation levels or patterns may be present as information in the output signal 37 and thus be displayed 99 graphically and visually in the joint image 900.

While specific embodiments of the invention have been shown and described in detail to illustrate the application of the principles of the invention, it will be understood that the invention may be embodied otherwise without departing from such principles.

APPENDIX

List of Reference Numbers

3 EIT data
10 Data processing and visualizing device
17 First control signal (tidal image)
27 Second control signal (RVD image)
30 Electrical impedance tomography apparatus
37 Output signal 50 Data input unit
70 Calculation and control unit
71 Impedance calculation unit
73 Data splitting unit
75 Delay calculation unit
76 Predefined duration $T_s$
77 Tidal image calculation unit
78 Volume/impedance criterion
79 Comparison variable in the observation period (inhalation, exhalation)
80 Image processing and output unit
81 Image superimposition unit
90 Data output unit
91 Tidal image output
93 RVD image output
97, 97' Operational controls
98 Interface
99 Component for graphic visualization (screen)
900 Joint image (tidal image/RVD image)
910, 910' Tidal image generation, tidal transverse view
911, 912 Regions B, A
930 RVD image generation
931 Global impedance curve $\Delta Z_{Global}$ (t) 931
933 Regional impedance curve $\Delta Z_B$ (t)
935 Regional impedance curve $\Delta Z_A$ (t)
1000 External monitor
1001 Hospital data network

What is claimed is:

1. A device for visualizing electrical impedance tomography (EIT) data of a plurality of regions of lungs to determine and visualize a tidal image of the lungs with ventilation delays in the lungs, wherein the EIT data are obtained from an electrical impedance tomography apparatus, the device comprising:
 a data input unit configured to receive and provide the EIT data of the plurality of regions of the lungs;
 a calculation and control unit, wherein:
  the calculation and control unit is configured to determine local impedance values and impedance changes of the plurality of regions of the lungs from the EIT data;
  the calculation and control unit is configured to determine a tidal image of the lungs with a local distribution of impedance values and impedance changes in the lungs from the determined local impedance values and local impedance changes and to generate and provide a first control signal of the lungs, which is representative of the determined tidal image of the lungs;
  the calculation and control unit is configured to determine regional ventilation delays in the lungs in relation to a comparison variable related to an observation period from the determined local impedance values and local impedance changes, wherein the regional ventilation delays are also determined using a volume/impedance criterion and the comparison variable in the observation period, the volume/impedance criterion being a ratio of a defined duration of a local region impedance curve to a defined duration of a global impedance curve, the defined duration being determined as a same percentage of local impedances and global maximum impedances respectively;
  the calculation and control unit is configured to analyze the determined regional ventilation delays in the lungs to determine whether the determined regional ventilation delays exceed a predefined duration;
  the calculation and control unit is configured to generate and provide a second control signal, which represents local regions of the lungs having regional ventilation delays that exceed the predefined duration;
 an image processing and output unit, wherein:
  the image processing and output unit is configured to generate, provide or output an output signal using the first control signal and the second control signal;
  the output signal represents a superimposition of the tidal image with an image of the local regions of the lungs having regional ventilation delays that exceed the predefined duration, the output signal not representing regional ventilation delays below the predefined duration, and local impedances which lead the global impedance; and
 a data output unit with a component for graphic visualization configured to provide a continuously changing joint image during the observation period based on the output signal, the data output unit being arranged or connected in or at the device for processing and visualizing EIT data, wherein the image that represents the local regions of the lungs having regional ventilation delays exceed the predefined duration is superimposed to the tidal image in the joint image, and wherein a duration of inhalation is determined from a shape of the global impedance curve.

2. The device in accordance with claim 1, wherein the duration of a phase of exhalation is selected as the observation period and the volume/impedance criterion is derived from shapes of global impedance curves of one or more phases of exhalation in combination with a tidal volume.

3. The device in accordance with claim 1, wherein the calculation and control unit is configured to perform a numerical stabilization of the EIT data, of the local impedances or impedance changes and to generate and provide a numerically stabilized second control signal and to use the numerically stabilized second control signal with the first control signal to generate, provide or output the output signal.

4. The device in accordance with claim 1, wherein the data output unit is configured to display the joint image to a user for visualization and assessment of a ventilation situation of individual local regions of the lungs.

5. The device in accordance with claim 1, wherein the data output unit is configured to display the joint image continuously to a user to visualize the continuously changing joint image during the observation period during ventilation of a patient, wherein the observation period comprises a patient inhalation period or a patient exhalation period during the ventilation of the patient and the graphic visualization comprises the continuously changing joint image of the tidal image of lungs with the lung regional ventilation delay as a chronological sequence during the observation period.

6. The device in accordance with claim 1, wherein: the electrical impedance tomography apparatus is connected to the data input unit and obtains the EIT data from a patient to provide the EIT data to the data input unit.

7. A method for detecting anomalies in lungs of a patient, the method comprising the steps of:
 receiving electrical impedance tomography (EIT) data representing impedances over time of a plurality of regions of the lungs;
 with a calculation and control unit, determining local impedances over time for each of the plurality of regions;
 with the calculation and control unit, generating a tidal image showing the plurality of regions of the lungs, and the local impedance for each of the plurality of regions;

with the calculation and control unit, determining global impedances over time of the lungs to determine a global impedance curve comprising a sum of determined local impedance values from the plurality of regions;

with the calculation and control unit, determining local impedance curves, each of the local impedance curves comprising local impedance values from one of the plurality of regions;

with the calculation and control unit, determining a comparison variable based on the global impedance curve and representing a lung region delay assessment reference point for an observation period comprising a patient inhalation or a patient exhalation;

with the calculation and control unit, determining a volume/impedance criterion comprising a ratio of a defined duration each of the local impedance curves to a defined duration of the global impedance curve;

with the calculation and control unit, accessing a predefined duration;

with the calculation and control unit, determining a regional ventilation delay for each of the plurality of regions in the lungs in relation to the comparison variable related to the observation period and based on the volume/impedance criterion of each of the plurality of regions;

with the calculation and control unit, determining regional ventilation delays which exceed the predefined duration;

with an image processing and output unit, displaying, during the observation period, the regional ventilation delay exceeding the predefined duration of each of the plurality of regions superimposed on corresponding regions of the tidal image;

not displaying regional ventilation delays below the predefined duration, and local impedances which lead the global impedance, wherein the step of displaying comprises providing a graphic visualization comprising a continuously changing joint image of the tidal image of lungs with the superimposed lung regional ventilation delay image, as a chronological sequence during the observation period.

8. The device of claim 1, wherein the calculation and control unit is configured to determine regional ventilation delays in the lungs during ongoing ventilation of the patient and without performing a low-flow maneuver.

9. A device for visualizing a tidal image of lungs with lung regional ventilation delays, the device comprising:

an electrical impedance tomography apparatus measuring electrical impedance tomography (EIT) data of a plurality of regions of lungs of a patient;

a calculation and control unit, wherein:

the calculation and control unit is configured to determine local impedance values and impedance changes of the plurality of regions of the lungs from the EIT data;

the calculation and control unit is configured to determine a tidal image with a local distribution of impedance values and impedance changes in the lungs from the local impedance values and local impedance changes and to generate and provide a first control signal of the lungs, which is representative of the determined tidal image of the lungs;

the calculation and control unit is configured to determine a global impedance curve comprising a sum of determined local impedance values from the plurality of regions;

the calculation and control unit is configured to determine local impedance curves, each of the local impedance curves comprising local impedance values of one of the plurality of regions;

the calculation and control unit is configured to determine a comparison variable based on the global impedance curve and representing a lung region delay assessment reference point for an observation period comprising a patient inhalation or a patient exhalation;

the calculation and control unit is configured to determine a volume/impedance criterion comprising a ratio of a defined duration of each of the local impedance curves to a defined duration of the global impedance curve, the defined duration being determined as a same percentage of local maximum impedances and global maximum impedances, respectively;

the calculation and control unit is configured to access a predefined duration;

the calculation and control unit is configured to determine regional ventilation delays in the lungs in relation to the comparison variable related to the observation period;

the calculation and control unit is configured to analyze the determined regional ventilation delays in the lungs to determine whether the determined regional ventilation delays exceed the predefined duration;

the calculation and control unit is configured to generate and provide a second control signal, which represents local regions of the lungs having regional ventilation delays that exceed the predefined duration; and an image processing and output unit, wherein:

the image processing and output unit is configured to generate, provide or output an output signal during the observation period using the first control signal and the second control signal; and the output signal represents a superimposition of the tidal image with an image of the local regions of the lungs having regional ventilation delays that exceed the predefined duration, the output signal not representing regional ventilation delays below the predefined duration, and not representing local impedances which lead the global impedance; and a data output unit configured to display the output signal to a user as a graphic visualization comprising a continuously changing joint image of the tidal image of lungs with the superimposed lung regional ventilation delay image, as a chronological sequence during the observation period.

10. The device of claim 9, wherein the calculation and control unit is configured to determine regional ventilation delays in the lungs during ongoing ventilation of the patient and without performing a low-flow maneuver.

11. The device in accordance with claim 9, wherein the calculation and control unit is configured to perform a numerical stabilization of the EIT data, of the local impedances or impedance changes and to generate and provide a numerically stabilized second control signal and to use the numerically stabilized second control signal with the first control signal to generate, provide or output the output signal.

12. The device in accordance with claim 9, wherein:

a duration of inhalation is determined from the shape of a global impedance curve; and/or a duration of exhalation is determined from the shape of a global impedance curve.

13. The method in accordance with claim 7, further comprising:

numerical stabilization of the EIT data, of the local impedances or impedance changes.

14. The method in accordance with claim 13, wherein:
said determining of the regional ventilation delay based on the volume/impedance criterion comprising a ratio of a defined duration each of the local impedance curves to a defined duration of the global impedance curve includes determining a difference between a local time point (tx) of the local impedances of one the plurality of regions and a global time point (Tx) of the global impedances.

15. The method in accordance with claim 14, wherein:
the local time point (tx) and global time point (Tx) are determined as a same percentage of local and global maximum impedances respectively.

16. The method in accordance with claim 14, wherein:
the local time point (tx) and global time point (Tx) are determined as a time when the local impedance and the global impedance are a same percentage of local and global maximum impedances respectively.

17. The method in accordance with claim 16, further comprising:
visualizing a lung state of a patient, during ventilation of the patient, based on displaying the regional ventilation delays superimposed on corresponding regions of the tidal image.

18. The method in accordance with claim 17, wherein:
the duration of a phase of exhalation is selected as the observation period and the volume/impedance criterion is derived from shapes of global impedance curves of one or more phases of exhalation in combination with the tidal volume.

19. The method in accordance with claim 17, wherein:
the duration of inhalation is determined from a shape of a global impedance curve and/or the duration of exhalation is determined from the shape of a global impedance curve.

20. The method according to claim 13, wherein determining the regional ventilation delay for each of the plurality of regions in the lungs takes place during ongoing ventilation of the patient and without performing a low-flow maneuver.

* * * * *